United States Patent
Troxell et al.

(10) Patent No.: US 7,352,355 B2
(45) Date of Patent: Apr. 1, 2008

(54) TRANSPARENT OVERLAY INPUT DEVICE

(75) Inventors: John R. Troxell, Sterling Heights, MI (US); Larry M. Oberdier, Royal Oak, MI (US); Marie I. Harrington, Troy, MI (US); David K. Lambert, Sterling Heights, MI (US)

(73) Assignee: Delphi Technologies, Inc., Troy, MI (US)

( * ) Notice: Subject to any disclaimer, the term of this patent is extended or adjusted under 35 U.S.C. 154(b) by 325 days.

(21) Appl. No.: 10/281,863

(22) Filed: Oct. 28, 2002

(65) Prior Publication Data

US 2004/0080486 A1  Apr. 29, 2004

(51) Int. Cl.
*G09G 5/00* (2006.01)

(52) U.S. Cl. ............... 345/156; 345/173; 345/179; 178/18.01; 178/18.06

(58) Field of Classification Search ........... 345/156, 345/173, 179; 178/18.01, 18.06
See application file for complete search history.

(56) References Cited

U.S. PATENT DOCUMENTS

| | | | |
|---|---|---|---|
| 3,886,311 A | 5/1975 | Rodgers et al. | |
| 4,194,083 A | 3/1980 | Abe et al. | |
| 4,379,287 A | 4/1983 | Tyler et al. | |
| 5,063,306 A | 11/1991 | Edwards | |
| 5,117,071 A * | 5/1992 | Greanias et al. | 345/178 |
| 5,594,222 A | 1/1997 | Caldwell | |
| 5,886,687 A | 3/1999 | Gibson | |
| 5,942,733 A | 8/1999 | Allen et al. | |
| 6,054,979 A | 4/2000 | Sellers | |
| 6,204,839 B1 | 3/2001 | Mato, Jr. | |
| 6,207,913 B1 * | 3/2001 | Nakajima et al. | 200/314 |
| 6,222,528 B1 * | 4/2001 | Gerpheide et al. | 345/173 |
| 6,239,788 B1 * | 5/2001 | Nohno et al. | 345/173 |
| 6,473,069 B1 * | 10/2002 | Gerpheide | 345/157 |
| 2004/0119688 A1 * | 6/2004 | Troxell et al. | 345/156 |

FOREIGN PATENT DOCUMENTS

| | | |
|---|---|---|
| EP | 0609021 | 3/1994 |
| EP | 1248228 | 9/2002 |
| GB | 2 319997 | * 10/1998 |
| JP | 07319623 | 8/1995 |

OTHER PUBLICATIONS

European Search Report for 03078051.4.

* cited by examiner

*Primary Examiner*—Richard Hjerpe
*Assistant Examiner*—Leonid Shapiro
(74) *Attorney, Agent, or Firm*—Jimmy L. Funke

(57) ABSTRACT

A transparent overlay input device includes a transparent non-conductive substrate, a plurality of transparent conductive electrode pairs and a transparent non-conductive cover. The plurality of transparent conductive electrode pairs are formed on the substrate and each form a proximity sensitive region and include a first electrode that receives an input signal and a second electrode that provides an output signal. The first and second electrodes are capacitively coupled and the capacitance of the electrode pair changes when a conductive member, e.g., a user's finger, is located near the electrode pair. The transparent non-conductive cover is formed on the substrate over the electrode pairs.

21 Claims, 3 Drawing Sheets

TRANSPARENT OVERLAY INPUT DEVICE

TECHNICAL FIELD

The present invention is generally directed to an input device and, more specifically, to a transparent overlay input device.

BACKGROUND OF THE INVENTION

In a number of applications, various users of electronic systems have found it desirable to interact with the electronic systems through a display, e.g., a computer monitor, a television, a personal digital assistant (PDA) and automated teller, in order to input information into the system. Thus, a number of designers have utilized various technologies in an attempt to improve touch sensitive input devices, such as touch sensitive screens and digitizer pads. Various types of these input devices have been designed using, for example, capacitive, resistive, infrared, surface acoustic wave (SAW) and guided acoustic wave (GAW) technologies.

Most touch sensitive screens implementing capacitive technology have been realized by fusing a transparent thin film conductive coating onto a glass surface. A low voltage AC field has then been applied to and distributed across the conductive coating such that when a user's finger made contact with a surface of the screen it capacitively coupled with the AC field drawing a small amount of current to the point of contact. In such screens, the current flow from each corner of the conductive coating is proportional to the distance to the user's finger and the ratios of the current flows are measured by a control unit to determine where the user touched the screen.

Typically, resistive touch sensitive screens have utilized a contacting member, e.g., a stylus, to form a momentary connection between two semi-flexible conductive layers. A control unit then determines where the contacting member touched the screen by sensing a change in voltage. Infrared technologies have implemented control units that detect a change in infrared light propagation, initiated when a user touches a touch screen, to determine where the user touched the screen.

Touch pads implementing SAW technology have generally included a glass panel with transducers that transmit and receive surface waves over the face of the touch pad. When a finger or other object touched the surface of the screen, a portion of the energy of the wave was absorbed at that location, which could then be determined by a control unit, based upon the presence of interference patterns in the acoustic wave. Typical characteristics of input devices implementing the above-referenced technologies are set forth below in Table 1.

TABLE 1

| | CAPACITIVE | RESISTIVE | INFRARED | GAW | SAW |
|---|---|---|---|---|---|
| Resolution (PPI) | >250 | >200 | 8 | 150 | 33 |
| Z-axis? | No | No | No | Yes | Yes |
| Ambient Light | Unaffected | Unaffected | Varies | Unaffected | Unaffected |
| Activation | Tactile | Tactile | Proximity | Tactile | Tactile |
| Parallax? | No | No | Yes | No | No |
| Response Time | 5-15 ms | 5-10 ms | 18-40 ms | 18-50 ms | 20-50 ms |
| Transmissivity | 85-92% | 65-80% | 100% | 92% | 92% |
| Sensor Reliability | 20 M touches/point | 35 M touches/point | 138 K hrs MTBF | Unlimited | 50 M touches/point |
| Integration | Invasive or non-invasive. | Invasive. Optical bonding required. | Invasive or non-invasive. | Invasive. Optical bonding required. | Invasive. Optical bonding required. |
| Stylus Type | Requires conductive stylus. Cannot detect gloved finger. | No stylus limitation. | No stylus limitation. | Requires soft, energy absorbing stylus. | Requires soft, energy absorbing stylus. |
| Sensor Drift | Subject to drift. Requires repetitive calibration, | Subject to drift. Requires repetitive calibration. | Not subject to drift. | Not subject to drift. | Not subject to drift. |
| Durability | Conductive layer subject to wear. | Sensor is susceptible to scratches and abrasions. | Not susceptible to scratching, no overlay, solid state. | Difficult to scratch. Glass overlay is breakable. | Difficult to scratch. Glass overlay is breakable. |
| Dust/Dirt Resistance | Accumulation affects performance. | Not affected by dust and dirt. | Will operate with dust and dirt. Excessive accumulation may affect performance. | Not affected by dust and dirt. | Will operate with dust and dirt. Excessive accumulation may affect performance. |

The various technologies have relative advantages and disadvantages depending upon the specific application. None of the currently available technologies are generally suitable for automotive display applications, which require minimal interaction time between driver and touch sensitive input device, allowing the driver to keep his/her eyes on the road and drive in a safe manner. Further, in general, most automotive display applications require only a limited number of touch sensitive "spots," as opposed to devices such as personal digital assistants that allow high resolution touch sensitive response. In addition, the driver may be wearing gloves, which affects the ability of currently available touch screens to properly resolve a point of contact on a display's surface.

What is needed for automotive applications is a transparent overlay input device that is durable and relatively inexpensive to manufacture. Ideally, such a device could be added to existing display systems. It would also be desirable if the transparent overlay input device minimized electromagnetic interference (EMI), so as to not adversely affect other electronic systems of the motor vehicle.

SUMMARY OF THE INVENTION

The present invention is directed to a transparent overlay input device that includes a transparent non-conductive substrate, a plurality of transparent conductive electrode pairs and a transparent non-conductive cover. The plurality of transparent conductive electrode pairs are formed on the substrate, and each forms a proximity sensitive region. These regions include a first electrode that receives an input signal and a second electrode that provides an output signal. The first and second electrodes are capacitively coupled and the capacitance of the electrode pair changes when a conductive member, e.g., a user's finger, is located near the electrode pair. The transparent non-conductive cover is formed on the substrate over the electrode pairs.

According to another embodiment of the present invention, the device includes a signal source providing the input signal to the first electrode and a phase sensitive detector for receiving the output signal from the second electrode such that an output of the detector changes when the conductive member is located near the electrode pair.

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which.

DESCRIPTION OF THE PREFERRED
EMBODIMENT(S)

According to an embodiment of the present invention, a transparent overlay input device implements a capacitive sensor, which can sense both the proximity of a user's finger and the actual physical contact of the user's finger. This allows for accurate sensing of the user's intention under a wide variety of conditions, including operation of the input device while the user is wearing gloves. According to the present invention, electronic circuitry is implemented which is capable of detecting very small changes in the capacitance of electrode pairs of the sensor due to the presence of a conductive member, e.g., a user's finger, near a first and second electrode of the electrode pair.

According to alternative embodiments of the present invention, the cost of the transparent overlay input device is minimized by multiplexing or distributing the input signal provided by a signal source. Thus, according to the present invention, a transparent overlay input device can be fabricated that is sensitive to human interaction and includes a multitude of sensing points, which are defined by electrode pairs. These electrode pairs are formed with a transparent conductive material that is deposited and patterned upon a transparent non-conductive substrate, e.g., a flexible dielectric material.

Figure 1:
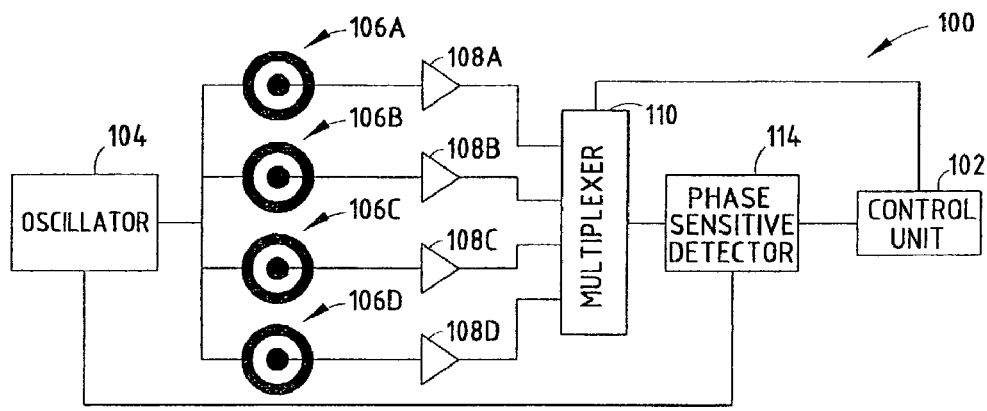
FIG. 1 is an electrical block diagram of an automotive display proximity sensitive input system, according to one embodiment of the present invention.
Figure 7A:
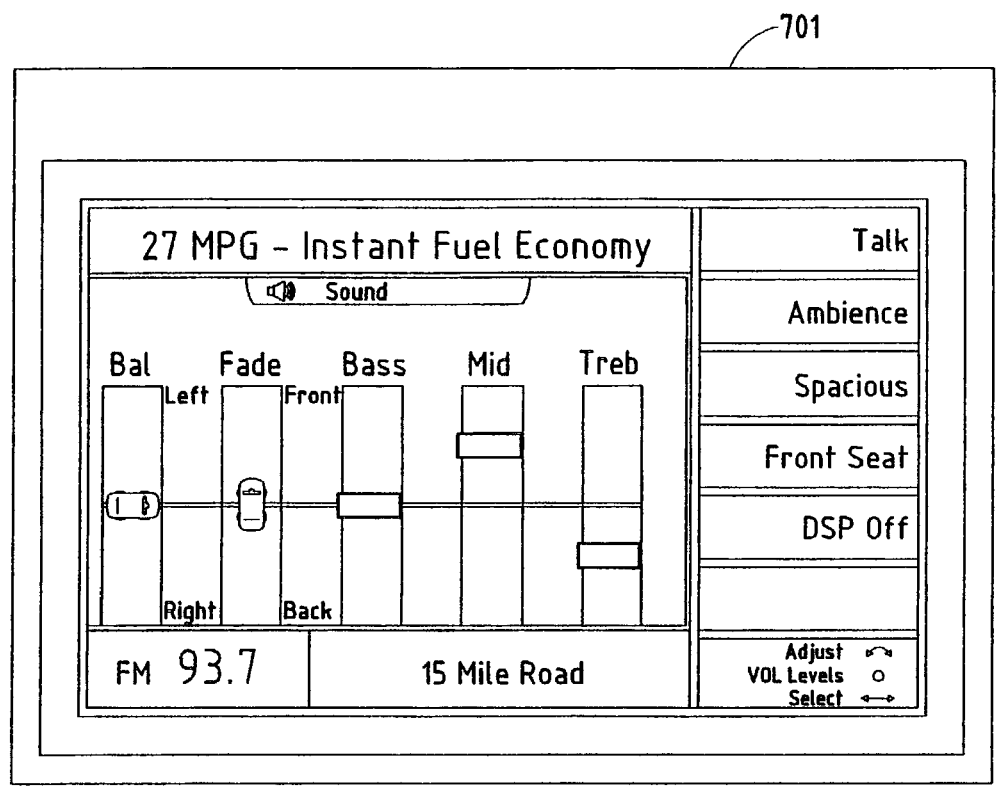
FIGS. 7A and 7B are front views of an exemplary automotive display panel as seen through a transparent overlay input device and a view of a plurality of electrode pairs of the input device, respectively, according to an embodiment of the present invention.
Figure 7B:
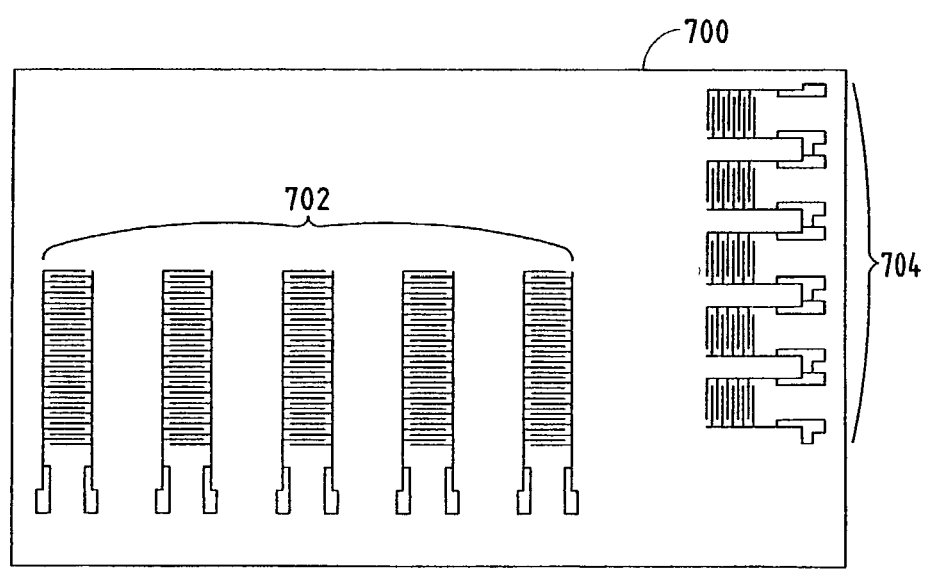

As is shown in FIG. 1, an automotive proximity sensitive input system 100 includes a control unit 102 that is coupled to an output of a phase sensitive detector 114 and to one or more select lines of a multiplexer 110. As used herein, the term "control unit" may include, for example, a microcontroller, a microprocessor with an application appropriate amount of volatile and non-volatile memory, a field programmable gate array (FPGA), FIGS. 7A and 7B are front views of an exemplary automotive display panel as seen through a transparent overlay input device and a view of a plurality of electrode pairs of the input device, respectively, according to an embodiment of the present invention.

DESCRIPTION OF THE PREFERRED
EMBODIMENT(S)

According to an embodiment of the present invention, a transparent overlay input device implements a capacitive sensor, which can sense both the proximity of a user's finger and the actual physical contact of the user's finger. This allows for accurate sensing of the user's intention under a wide variety of conditions, including operation of the input device while the user is wearing gloves. According to the present invention, electronic circuitry is implemented which is capable of detecting very small changes in the capacitance of electrode pairs of the sensor due to the presence of a conductive member, e.g., a user's finger, near a first and second electrode of the electrode pair.

According to alternative embodiments of the present invention, the cost of the transparent overlay input device is minimized by multiplexing or distributing the input signal provided by a signal source. Thus, according to the present invention, a transparent overlay input device can be fabricated that is sensitive to human interaction and includes a multitude of sensing points, which are defined by electrode pairs. These electrode pairs are formed with a transparent conductive material that is deposited and patterned upon a transparent non-conductive substrate, e.g., a flexible dielectric material.

As is shown in FIG. 1, an automotive proximity sensitive input system 100 includes a control unit 102 that is coupled to an output of a phase sensitive detector 114 and to one or more select lines of a multiplexer 110. As used herein, the term "control unit" may include, for example, a microcontroller, a microprocessor with an application appropriate amount of volatile and non-volatile memory, a field programmable gate array (FPGA), an application specific integrated circuit (ASIC) and a programmable logic device (PLD). The oscillator (i.e., signal source) 104 provides an input signal (e.g., an AC signal having a frequency less than 1 MHz) to a first electrode of each of a plurality of electrode pairs 106A, 106B, 106C and 106D.

A second electrode of the electrode pair 106A is coupled to an input of an amplifier 108A, whose output is coupled to a first input of the multiplexer 110, and a second electrode of the electrode pair 106B is coupled to an input of an amplifier 108B, whose output is coupled to a second input of the multiplexer 110. A second electrode of the electrode pair 106C is coupled to an input of an amplifier 108C, whose output is coupled to a third input of the multiplexer 110, and a second electrode of the electrode pair 106D is coupled to an input of an amplifier 108D, whose output is coupled to a fourth input of the multiplexer 110.

An output of the oscillator 104 is also provided to an input of the detector 114 and is used as a reference signal such that the detector 114 can detect a signal at the same frequency as the oscillator, but at a 90 degree phase shift. Thus, the detector output is proportional to the inter-electrode capacitance at each electrode pair 106A-106D, when a conductive member is placed in the vicinity of one of the electrode pairs 106A-106D. The amplifiers 108A-108D may be, for example, transconductance amplifiers, which amplify the currents that are capacitively coupled between the electrodes of the electrode pairs 106A-106D.

The control unit 102 controls the multiplexer 110 by providing an appropriate signal on the select line(s) of the multiplexer 110 such that the detector 114 periodically receives a signal routed through each of the electrode pairs 106A-106D. Thus, the control unit 102 can determine when a conductive member is located near a given one of the electrode pairs 106A-106D. While only four electrode pairs are shown in FIG. 1, it should be appreciated that fewer or greater number of electrode pairs can be implemented depending upon the application. Further, while the first electrode of each of the electrode pairs 106A-106D is shown encircling the second electrode of each of the electrode pairs 106A-106D, it should be appreciated, as is discussed below, that a number of different types of electrode pair structures can be implemented. As will be discussed in detail below, the first and second electrodes of the electrode pairs 106A-106D are formed of a transparent conductive material (e.g., indium-tin-oxide (ITO)), which is formed on a transparent non-conductive substrate (e.g., glass or polymer based substrate).

Figure 2:
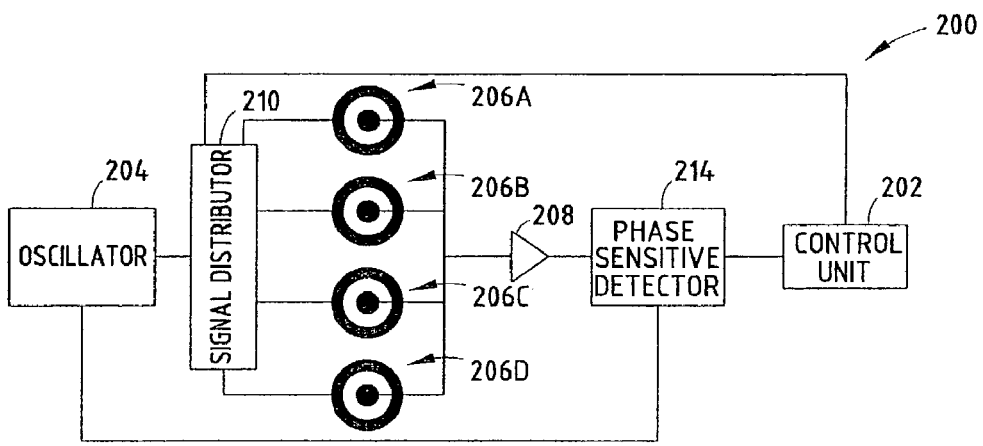
FIG. 2 is an electrical block diagram of an automotive display proximity sensitive input system, according to another embodiment of the present invention.

FIG. 2 depicts an alternative automotive proximity sensitive input system 200, which distributes a signal received from an oscillator (i.e., a signal source) 204 and provides the distributed signal to one of a first electrode of a plurality of electrode pairs 206A-206D. As is shown in FIG. 2, one or more outputs of a control unit 202 are coupled to one or more select lines of a signal distributor 210 and an input of the control unit 202 is coupled to an output of a phase sensitive detector 214. A first input of the detector 214 is coupled to an output of an amplifier 208, whose input is coupled to a second electrode of each of the electrode pairs 206A, 206B, 206C and 206D. A second input of the detector 214 receives a reference signal from the signal source 204.

During operation of the system 200, the control unit 202 is programmed to periodically control the select line(s) of the distributor 210 such that an input signal provided by the oscillator 204 to an input of the distributor 210 is sequentially provided to a plurality of outputs of the distributor 210. As shown in FIG. 2, the outputs of the distributor 210 are coupled to a first electrode of the electrode pairs 206A-206D. It should be appreciated that the system 200 only requires one amplifier, while the system 100 of FIG. 1 requires four amplifiers. Based upon the output of the detector 214, the control unit 202 can determine if a user has located a conductive member, e.g., a user's finger, near one or more of the electrode pairs 206A-206B and, if so, implement an appropriate function based upon the function assigned to a given electrode pair.

Figure 3:
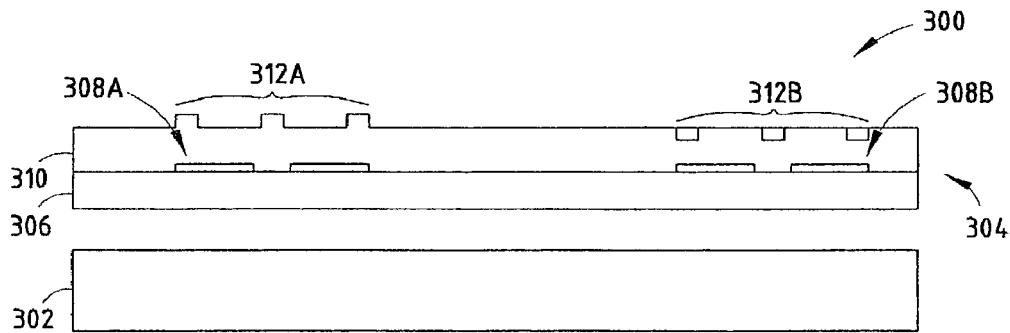
FIG. 3 is a cross section of an automotive display panel and a transparent overlay input device, according to one embodiment of the present invention.

FIG. 3 depicts a portion of an automotive proximity sensitive input system 300, which includes an automotive display panel (e.g., a liquid crystal diode (LCD) display) 302, which provides desired graphics to a vehicle occupant through a transparent overlay input device 304. The input device 304 includes a transparent non-conductive substrate 306, which has formed thereon a plurality of transparent conductive electrode pairs 308A and 308B. A transparent non-conductive cover 310 is formed over the transparent conductive electrode pairs 308A and 308B. The transparent non-conductive cover 310 may include touch sensitive areas 312A and 312B (to provide tactile feedback to a user) formed in the vicinity of the electrode pairs 308A and 308B, respectively, which may be raised or indentations formed in the transparent non-conductive cover 310.

Figure 5:
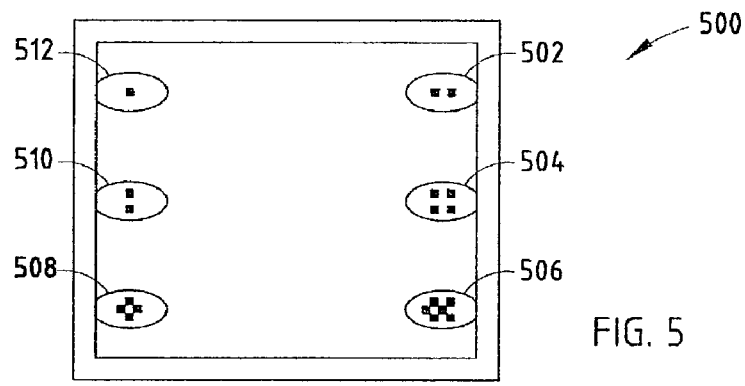
FIG. 5 is a front view of a transparent overlay input device including a plurality of touch sensitive areas, according to another embodiment of the present invention.

With reference to FIG. 5, the touch sensitive areas 312A and 312B (of FIG. 3) may take on various shapes 502-512 in an automotive proximity sensitive input system 500. Utilizing textured touch sensitive areas can advantageously allow a vehicle operator to provide an input to the transparent overlay input device while maintaining their eyes on the road for increased safety. It should be appreciated that other patterns may be utilized for the texturing of touch sensitive areas to provide various degrees of tactile feedback to a vehicle operator. Referring back to FIG. 3, it should be appreciated that the layers of the input device 304 may be flexible such that the input device 304 can conform to the surface of various types of display panels.

Figure 4:
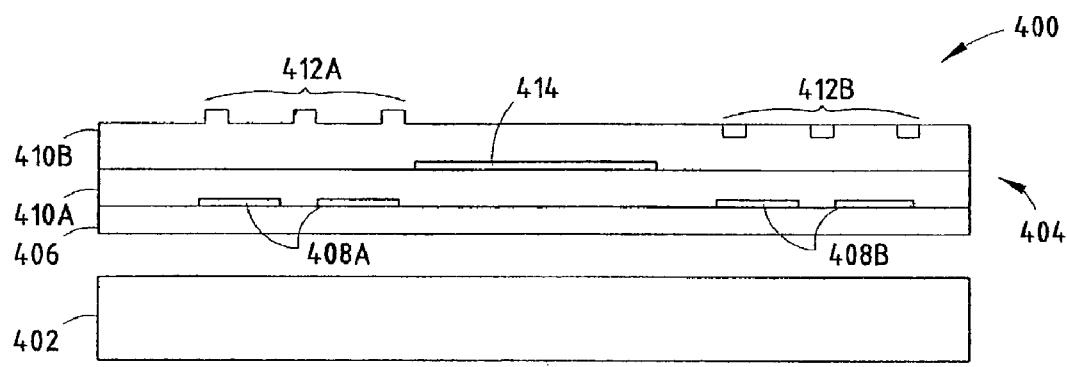
FIG. 4 is a cross section of an automotive display panel and a transparent overlay input device, according to another embodiment of the present invention.

FIG. 4 depicts an automotive proximity sensitive input system 400, according to another embodiment of the present invention. The input device 404 includes a transparent non-conductive substrate 406, which has formed thereon, a plurality of transparent electrode pairs 408A and 408B. A first transparent non-conductive cover 410A is formed on the substrate 406 over the transparent electrode pairs 406A and 406B. A second transparent conductive layer 414 is formed on the first transparent non-conductive cover 410A in areas away from the electrode pairs 408A and 408B. A second transparent non-conductive cover 410B is formed over the second transparent conductive layer 414 and may include textured areas 412A and 412B above the electrode pairs 408A and 408B to provide tactile feedback to a user. As is shown in FIG. 4, the textured area 412A includes a series of bumps and the textured area 412B includes a series of indentations.

The primary difference between the system 400 of FIG. 4 and the system 300 of FIG. 3 is that the second transparent conductive layer 414 has been formed on the first transparent non-conductive cover 410A in areas away from electrode pairs 408A and 408B. The second transparent conductive layer 414, in general, results in improved operation of the input device 404 by defining sensitive and non-sensitive regions for the input device 404. That is, by shielding the first and second electrode leads of the electrode pairs 408A and 408B, formed on transparent substrate 406, erroneous signals are not generated as a vehicle occupant moves their hand across the face of the input device 404.

Figure 6:
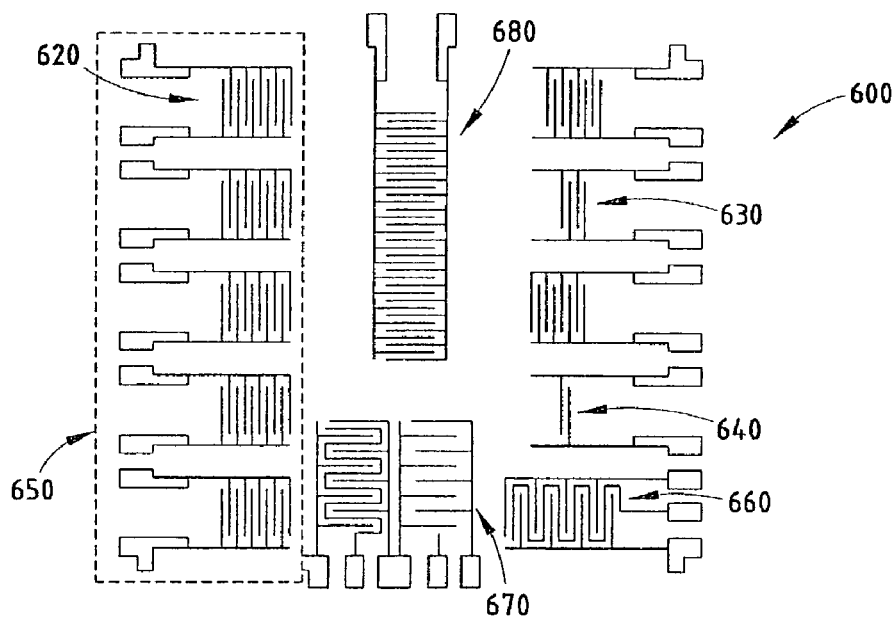
FIG. 6 is a schematic view of a number of transparent conductive electrode pairs whose first and second electrodes each include interdigitated fingers.

Turning to FIG. 6, a test pattern 600 is illustrated which shows a number of electrode pairs with different exemplary structures. It should be appreciated that the details of the electrode pair (i.e., the switch pad geometry) determine the range of the switching effect, the overlap between adjacent switch pad locations and the ability to implement more complicated switching functions, e.g., multi-step switching or potentiometric switching (by variations in the pattern of the electrode pairs or by temporal modulation of the driving signals) to, for example, change radio volume and/or channel. An electrode pair 620 is formed with contacting leads that connect external circuitry to an interdigitated series of fingers whose number may be adjusted as is shown by electrode pairs 630 and 640 to achieve a desired sensitivity.

As is shown in FIG. 6, the spacing between the fingers and the relative width of the fingers with respect to the spacing may also be adjusted and may include several adjacent electrode pairs 650. The nodes may be identical or they may comprise different variations of the illustrated embodiments. A typical electrode pair may approximate the size of a fingertip, e.g., on the order of 1.3 cm$^2$, although other variations are envisioned. Electrode pair 660 depicts the use of a ground plane (or a differently biased conductive element) implemented between interdigitated first and second electrodes. Electrode pair 670 shows the electrode pair 660 minus the ground trace between the first and second electrodes. Electrode pair 680 shows the electrode pair 620 with an increased member of interdigitated fingers. As was previously mentioned, a control unit of an automotive display proximity sensitive input system sequentially interrogates or drives each electrode pair to evaluate the capacitance change from nominal and applies a decision threshold to evaluate the intentions of a vehicle occupant. Alternatively, different sensor structures can be utilized to vary sensitivity and/or provide potentiometer like inputs. Such structures can make use of variations in the pitch of the interdigitated structures or in the separation between a pair of fingers.

FIGS. 7A and 7B illustrate exemplary graphics 701 provided by an automotive display and associated transparent conductive electrode pairs 702 and 704, which are formed in a transparent overlay input device 700, respectively. Variations in electrode pair geometries can be used to achieve variation in sensing sensitivity. For example, the electrode pairs 702 have increased sensitivity, with respect to the electrode pairs 704.

Accordingly, a transparent overlay input device has been described herein, which allows for easy operation and can be utilized by a user wearing gloves and, as such, is particularly advantageous when implemented within an automotive environment. According to the present invention, a transparent overlay input device can be implemented within an automotive environment for a relatively low cost. This device can resolve a few femtofarads of capacitance change out of picofarads of differential capacitance and nanofarads of shunt capacitance. Such a system is relatively immune to environmental effects, such as water, dirt and temperature and tends to minimize electromagnetic interference (EMI) with other vehicle systems due to its operation at relatively low frequencies. Additionally, the method for detecting capacitance can make use of an oscillator that produces a fundamental frequency and harmonics (e.g., a triangle wave) or a fundamental frequency alone (e.g., a sine wave) for further suppression of potential EMI issues. In automotive display applications, such as reconfigurable message centers, map displays and/or high content entertainment systems, implementing an automotive display system, according to the present invention, is particularly advantageous. If the transparent overlay input device is implemented as a flexible device, it can be implemented on displays with non-planar geometry.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the Doctrine of Equivalents.

What is claimed is:

1. A transparent overlay input device adapted to overlay a system display panel visually displaying system function related graphics to a system user through said transparent overlay input device, said overlay input device comprising:

a transparent non-conductive substrate, said substrate forming an inner surface adapted for affixation to a display panel and an outer surface;

a plurality of transparent independent conductive electrode pairs formed on the outer surface of the substrate, wherein each of the electrode pairs forms a discrete proximity sensitive region at a predetermined location on said outer surface and includes a first electrode that receives an input signal and a second electrode that provides an output signal, and wherein the first and second electrodes of each of the electrode pairs are disposed adjacent to one another and are capacitively coupled wherein the capacitance of each of the electrode pairs changes when a conductive member is located near a given one of the electrode pairs, and wherein each of the electrode pairs are positioned on said outer surface to register with an associated graphic displayed on said display panel; and a first transparent non-conductive cover formed on the outer surface of the substrate over the transparent electrode pairs.

2. The device of claim 1, further including:

a signal source for providing the input signal to the first electrodes; and a phase sensitive detector for receiving the output signal from the second electrodes, wherein a reference input of the detector receives a reference signal from the signal source and an output of the detector provides an indication when the conductive member is located near one of the electrode pairs.

3. The device of claim 2, further including:

a signal distributor including an input, a plurality of outputs and a plurality of select lines, where the input of the signal distributor receives the input signal from the signal source and a different one of the plurality of outputs of the signal distributor is coupled to each of the first electrodes; and a control unit including a plurality of outputs and an input, wherein a different one of the outputs of the control unit are coupled to each of the select lines of the signal distributor and the input of the control unit is coupled to the output of the detector, and wherein the control unit controls the select lines of the signal distributor to periodically causes the signal distributor to sequentially provide the input signal to each of the first electrodes.

4. The device of claim 2, further including:

a multiplexer including an output, a plurality of inputs and a plurality of select lines, wherein a different one of the inputs of the multiplexer are coupled to each of the second electrodes whose associated first electrode receives the input signal from the signal source, and wherein the output of the multiplexer is coupled to the input of the detector; and a control unit including a plurality of outputs and an input, wherein a different one of the outputs of the control unit are coupled to each of the select lines of the multiplexer and the input of the control unit is coupled to the output of the detector, and wherein the control unit controls the select lines of the multiplexer to periodically cause the multiplexer to sequentially couple each of the second electrodes to the input of the detector.

5. The device of claim 1, wherein the first and second electrodes each include a planar array of spaced conductive fingers, and wherein the fingers of the first and second electrodes are spacially interdigitated on said plane.

6. The device of claim 1, wherein the first electrode surrounds the second electrode.

7. The device of claim 1, further including:
a second transparent conductive layer formed on the first transparent non-conductive cover in areas away from the electrode pairs; and
a second transparent non-conductive cover formed over the second transparent conductive layer.

8. The device of claim 7, wherein the second transparent non-conductive cover includes textured areas above the electrode pairs to provide tactile feedback to a user.

9. The device of claim 1, wherein the first transparent non-conductive cover includes textured areas above the electrode pairs to provide tactile feedback to a user.

10. An automotive display system, comprising:
an automotive display panel for providing at least one of motor vehicle operating information and motor vehicle accessory information to a system user; and
a transparent overlay input device attached to the automotive display panel such that graphics displayed by the panel are visible to the user through the device, the device including:
a transparent non-conductive substrate forming an outer surface;
a plurality of transparent independent conductive electrode pairs formed on the outer surface of the substrate, wherein each of the electrode pairs forms a discrete proximity sensitive region at a predetermined location on said outer surface and includes a first electrode that receives an input signal and a second electrode that provides an output signal, and wherein the first and second electrodes of each of the electrode pairs are disposed adjacent to one another and are capacitively coupled wherein the capacitance of each of the electrode pairs changes when a conductive member is located near a given one of the electrode pairs and wherein each of the electrode pairs are positioned on said outer surface to register with an associated graphic displayed on said display panel; and
a first transparent non-conductive cover formed on the outer surface of the substrate over the transparent electrode pairs.

11. The system of claim 10, wherein the device further includes:
a signal source for providing the input signal to the first electrodes; and
a phase sensitive detector for receiving the output signal from the second electrodes, wherein a reference input of the detector receives a reference signal from the signal source and an output of the detector provides an indication when the conductive member is located near one of the electrode pairs.

12. The system of claim 11, wherein the device further includes:
a signal distributor including an input, a plurality of outputs and a plurality of select lines, where the input of the signal distributor receives the input signal from the signal source and a different one of the plurality of outputs of the signal distributor is coupled to each of the first electrodes; and a control unit including a plurality of outputs and an input, wherein a different one of the outputs of the control unit are coupled to each of the select lines of the signal distributor and the input of the control unit is coupled to the output of the detector, and wherein the control unit controls the select lines of the signal distributor to periodically causes the signal distributor to sequentially provide the input signal to each of the first electrodes.

13. The system of claim 11, wherein the device further includes:
a multiplexer including an output, a plurality of inputs and a plurality of select lines, wherein a different one of the inputs of the multiplexer are coupled to each of the second electrodes whose associated first electrode receives the input signal from the signal source, and wherein the output of the multiplexer is coupled to the input of the detector; and
a control unit including a plurality of outputs and an input, wherein a different one of the outputs of the control unit are coupled to each of the select lines of the multiplexer and the input of the control unit is coupled to the output of the detector, and wherein the control unit controls the select lines of the multiplexer to periodically cause the multiplexer to sequentially couple each of the second electrodes to the input of the detector.

14. The system of claim 10, wherein the first and second electrodes each include a planar array of spaced conductive fingers, and wherein the fingers of the first and second electrodes are spacially interdigitated on said plane.

15. The system of claim 10, wherein the first electrode surrounds the second electrode.

16. The system of claim 10, wherein the device further includes:
a second transparent conductive layer formed on the first transparent non-conductive cover in areas away from the electrode pairs; and
a second transparent non-conductive cover formed over the second transparent conductive layer.

17. The system of claim 16, wherein the second transparent non-conductive cover includes textured areas above the electrode pairs to provide tactile feedback to a user.

18. The system of claim 10, wherein the first transparent non-conductive cover includes textured areas above the electrode pairs to provide tactile feedback to a user.

19. A transparent overlay input device adapted to overlay a system display panel visually displaying system function related graphics to a system user through said transparent overlay input device, such overlay input device, comprising:
a transparent non-conductive substrate, said substrate forming an inner surface adapted for affixation to a display panel and an outer surface;
a plurality of transparent independent conductive electrode pairs formed on the outer surface of the substrate, wherein each of the electrode pairs forms a discrete proximity sensitive region at a predetermined location on said outer surface and includes a first electrode that receives an input signal and a second electrode that provides an output signal, and wherein the first and second electrodes of each of the electrode pairs are disposed adjacent to one another and are capacitively coupled wherein the capacitance of each of the electrode pairs changes when a conductive member is located near a given one of the electrode pairs and wherein each of the electrode pairs are positioned on said outer surface to register with an associated graphic displayed on said display panel;

a first transparent non-conductive cover formed on the outer surface of the substrate over the transparent electrode pairs;

a signal source for providing the input signal to the first electrodes; and a phase sensitive detector for receiving the output signal from the second electrodes, wherein a reference input of the detector receives a reference signal from the signal source and an output of the detector provides an indication when the conductive member is located near one of the electrode pairs.

20. The device of claim 19, further including:

a signal distributor including an input, a plurality of outputs and a plurality of select lines, where the input of the signal distributor receives the input signal from the signal source and a different one of the plurality of outputs of the signal distributor is coupled to each of the first electrodes; and a control unit including a plurality, of outputs and an input, wherein a different one of the outputs of the control unit are coupled to each of the select lines of the signal distributor and the input of the control unit is coupled to the output of the detector, and wherein the control unit controls the select lines of the signal distributor to periodically causes the signal distributor to sequentially provide the input signal to each of the first electrodes.

21. The device of claim 19, further including:

a multiplexer including an output, a plurality of inputs and a plurality of select lines, wherein a different one of the inputs of the multiplexer are coupled to each of the second electrodes whose associated first electrode receives the input signal from the signal source, and wherein the output of the multiplexer is coupled to the input of the detector; and a control unit including a plurality of outputs and an input, wherein a different one of the outputs of the control unit are coupled to each of the select lines of the multiplexer and the input of the control unit is coupled to the output of the detector, and wherein the control unit controls the select lines of the multiplexer to periodically cause the multiplexer to sequentially couple each of the second electrodes to the input of the detector.

* * * * *